Patented Oct. 19, 1948

2,451,712

UNITED STATES PATENT OFFICE 2,451,712

ACROLEIN AND ETHYLENE BY PYROLYSIS OF DIHYDROPYRAN

John George Mackay Bremner and David Gwyn Jones, Norton-on-Tees, England, assignors to Imperial Chemical Industries Limited, a corporation of Great Britain No Drawing. Application August 9, 1944, Serial No. 548,804. In Great Britain August 10, 1943

3 Claims. (Cl. 260—601)

This invention relates to the production of acrolein and ethylene.

According to the present invention acrolein and ethylene are produced by heating 2:3 dihydropyran, preferably at a temperature exceeding 350° C. The temperature may be varied over a wide range, the upper limit being governed by the decomposition of the acrolein. The higher the temperature employed, the shorter should be the period of heating in order to avoid decomposition of the acrolein. We have found that the best results are obtained using a reaction temperature of 450° C.–500° C.

The reaction may be carried out in the presence of a cracking catalyst, e. g., aluminum silicate, but good yields of acrolein and ethylene can be obtained by simple thermal decomposition. The reaction vessel may be made, for example, of glass or of stainless steel.

The reaction takes place satisfactorily at atmospheric pressure but reduced or increased pressure may also be employed depending on the other operating conditions.

The dihydropyran may be produced in situ by passing tetrahydrofurfuryl alcohol into the reaction vessel which is packed with a dehydrating catalyst and heated to above 400° C. By suitable choice of reaction temperature and space velocity, the dihydropyran as it is formed is converted into acrolein and ethylene.

Example 1

150 ccs. of 2:3 dihydropyran were passed at a liquid space velocity of 0.5 litre per litre of reaction space per hour through a tube packed with silica chips and maintained at between 500° C. and 550° C. The reaction product was condensed in ice-cooled and solid carbon dioxide-cooled catchpots. The gas remaining after this treatment was measured and sampled. The liquid which condensed in the catchpots was distilled when 71 gms. of material of boiling point 51.5° C. to 60° C. were obtained. This material consisted mainly of acrolein. 36.7 litres of gas issued from the catchpots consisted of 93.6% of olefins mainly ethylene. 4 gms. of unchanged dihydropyran were recovered from the liquid products.

Example 2

85 gms. of dihydropyran were passed through an empty mild steel tube at a temperature of 450° C. to 500° C. at a liquid space velocity of 0.5 litre per litre of reaction space per hour. The reaction products were passed into catchpots as described in Example 1, and 53 gms. of condensate were obtained and 19.3 litres of gas issued from the catchpots. On analysis the gas was found to contain 83% by volume of ethylene and 10.6% by volume of carbon dioxide. The liquid condensate was distilled when 38 gms. of acrolein and 8 gms. of unchanged dihydropyran were recovered.

We claim:

1. A process for simultaneously producing producing acrolein and ethylene which comprises flowing 2,3-dihydropyran through a heated reaction space at a temperature of 450° to 500° C. at a space velocity of about 0.5 volume of liquid dihydropyran per volume of reaction space per hour and cooling the effluent and separating acrolein from the resulting condensate.

2. A process for simultaneously producing acrolein and ethylene which comprises flowing 2,3-dihydropyran through a heated reaction space at a temperature between 500 and 550° C. in contact with a cracking catalyst at a space velocity of about 0.5 volume of liquid dihydropyran per volume of reaction space per hour and cooling the effluent and separating acrolein from the resulting condensate.

3. A process for simultaneously producing acrolein and ethylene which comprises flowing 2,3-dihydropyran through a heated reaction space at a temperature between 500 and 550° C. in contact with a cracking catalyst comprising aluminum silicate at a space velocity of about 0.5 volume of liquid dihydropyran per volume of reaction space per hour and cooling the effluent and separating acrolein from the resulting condensate.

JOHN GEORGE MACKAY BREMNER.
DAVID GWYN JONES.

REFERENCES CITED

The following references are of record in the file of this patent:

UNITED STATES PATENTS

| Number | Name | Date |
|---|---|---|
| 2,273,484 | Guinot | Feb. 17, 1942 |
| 2,348,531 | Egloff | May 9, 1944 |
| 2,387,366 | Toussaint | Oct. 23, 1945 |

FOREIGN PATENTS

| Number | Country | Date |
|---|---|---|
| 547,334 | Great Britain | Aug. 24, 1942 |

OTHER REFERENCES

"The Pyrolysis of Carbon Compounds," Hurd (1929), page 364.

Perkins, "Journal Chemical Society," vol. 51, 702 (1887).

Wilson, J. A. C. S., vol. 69, No. 12, pages 3004 to 3006, Dec. 1947.